Sept. 16, 1941.　　H. T. WENTWORTH　　2,256,365
DUAL RELIEF VALVE
Filed April 29, 1941　　4 Sheets-Sheet 1

INVENTOR
Harry T. Wentworth,
BY
Harry B. Cook.
ATTORNEY

Sept. 16, 1941.  H. T. WENTWORTH  2,256,365
DUAL RELIEF VALVE
Filed April 29, 1941  4 Sheets-Sheet 3

INVENTOR
Harry T. Wentworth,
BY Harry B. Cook,
ATTORNEY

Sept. 16, 1941.　　　H. T. WENTWORTH　　　2,256,365
DUAL RELIEF VALVE
Filed April 29, 1941　　　4 Sheets-Sheet 4
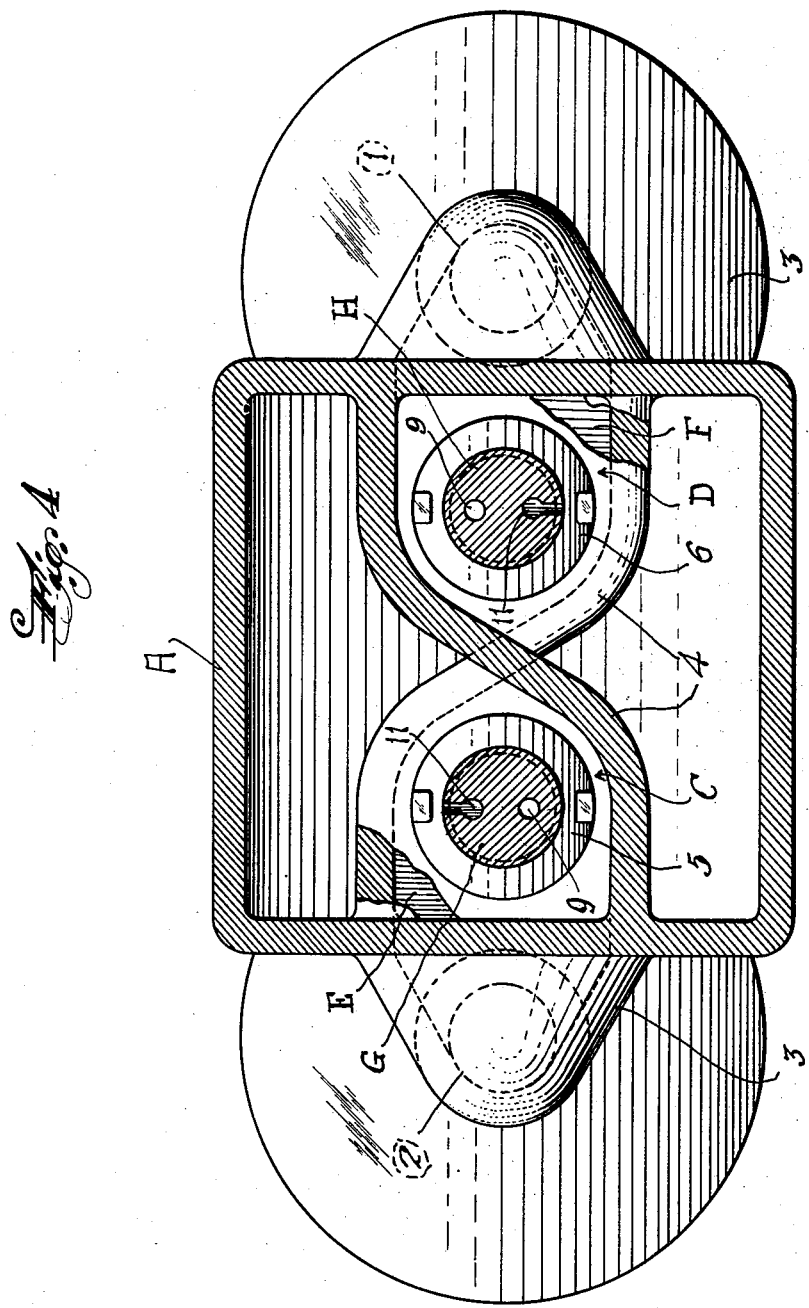
INVENTOR
Harry T. Wentworth,
BY Harry B. Rook,
ATTORNEY Patented Sept. 16, 1941

2,256,365

UNITED STATES PATENT OFFICE 2,256,365

DUAL RELIEF VALVE

Harry T. Wentworth, South Orange, N. J., assignor to Foster Engineering Co., Newark, N. J., a corporation of New Jersey Application April 29, 1941, Serial No. 390,875

7 Claims. (Cl. 137—53)

This invention relates in general to fluid pressure relief valve apparatus and more particularly to a valve apparatus for relieving pressure from either of two pipe lines into the other, for example in a system such as fluid pressure operated hoisting apparatus, where each pipe line alternately carries high pressure and low pressure while at the same time the other pipe line carries low pressure and high pressure respectively.

One object of the invention is to provide a relief valve apparatus of this character which shall include a novel and improved combination of a relief valve for each pipe line and a pilot valve for controlling each relief valve wherein each valve shall be capable of relieving excess pressure from its corresponding pipe line into the other pipe line and all possibility of both valves opening simultaneously shall be prevented.

Another object is to provide a relief valve apparatus of the character described wherein each relief valve shall have an inlet communicating with the corresponding pipe line and an outlet communicating with the other pipe line and the inlet of each valve shall be in common or in direct communication with the outlet of the other valve, and each relief valve shall be accurately and positively controlled by its corresponding pilot valve at all times and strictly in accordance with the pressure in its corresponding pipe line.

A further object is to provide in a relief valve apparatus of the type that comprises a main relief valve and a piston-operated pilot valve, a novel and improved construction and combination of parts wherein the over-pressure that operates said pilot valve shall be sustained under the pilot valve piston as long as said pressure exists in the line, so as to ensure accurate and positive control of the main valve.

Other objects are to provide a novel, improved, simple and compact combination of two relief valves and a pilot valve mechanism for each thereof into a unit to facilitate assembly of the parts and installation of the apparatus; and to obtain other advantages and results as will be brought out by the following description.

In the accompanying drawings—

Figure 4 is a horizontal sectional view on the line 4—4 of Figure 3, and

Figure 1:
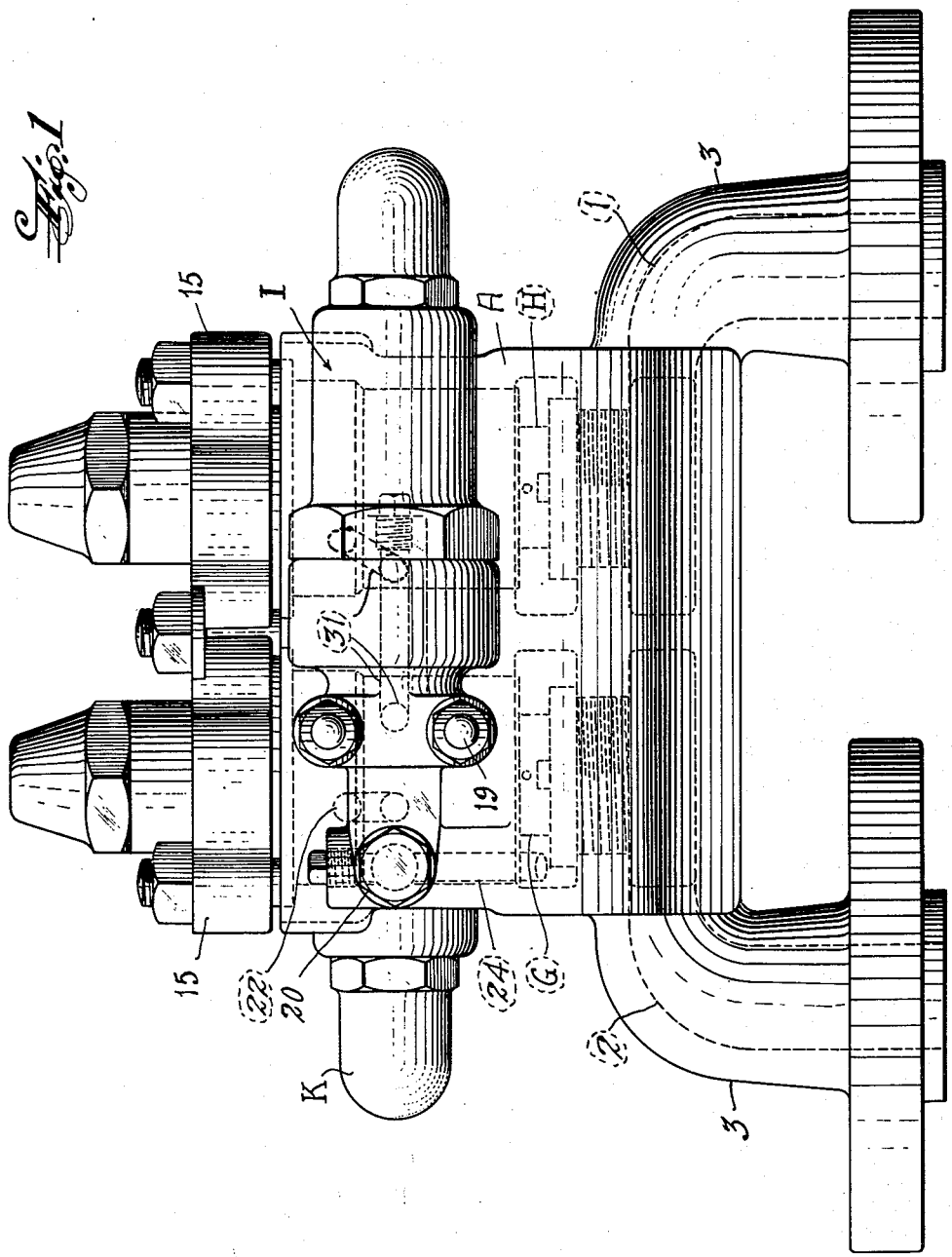
Figure 1 is a side elevational view of a fluid pressure relief valve apparatus embodying my invention.
Figure 2:
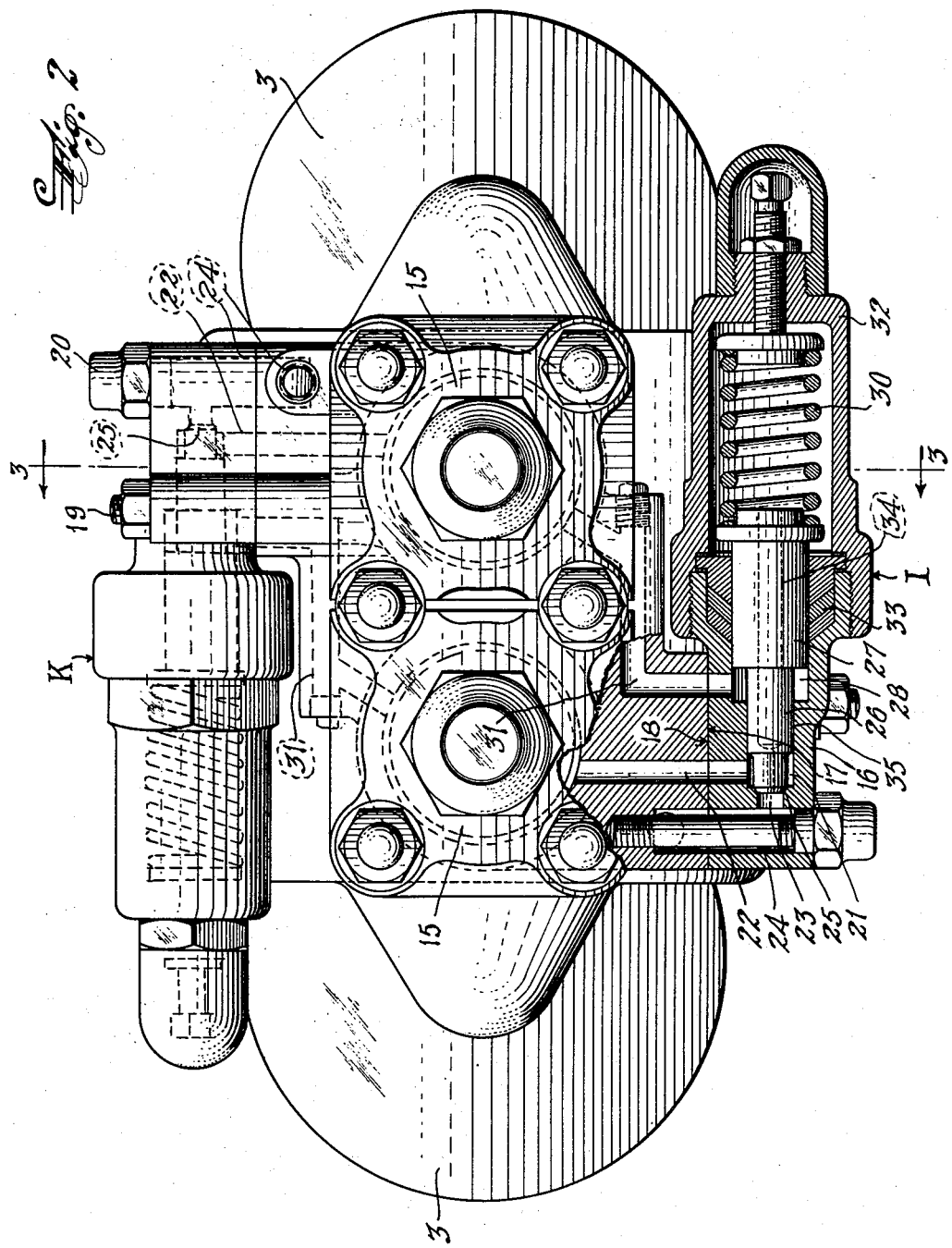
Figure 2 is a top plan view thereof with portions broken away and shown in horizontal section.
Figure 3:
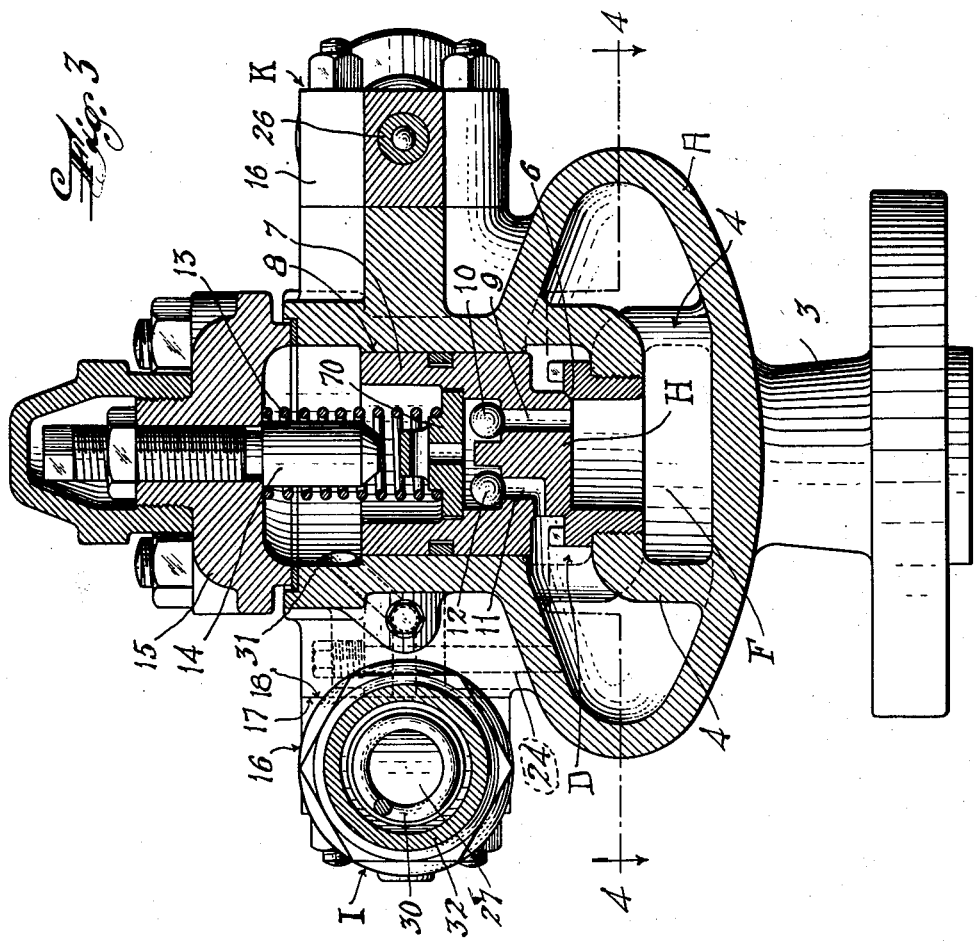
Figure 3 is a transverse vertical sectional view on the line 3—3 of Figure 2.
Figure 5:
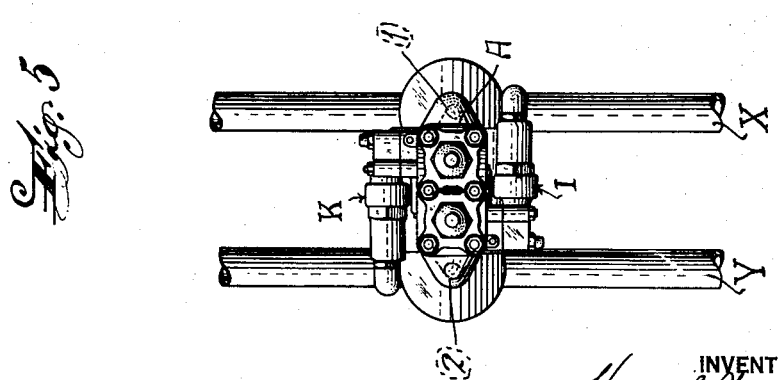
Figure 5 is a top plan view showing one manner of installing the relief valve apparatus.

Specifically describing the invention, the apparatus includes a main casing A which has two ports 1 and 2 leading outwardly through elbows or other suitable extensions 3 for connecting the apparatus in a fluid pressure system, for example, for connecting one of the ports to each of two pipe lines X and Y as shown in Figure 5. Either of the ports 1 and 2 may serve as an entrance for fluid, while the other serves as an exit. The interior of the casing is divided by integrally cast partitions 4 to form two passages which have the respective valve seats 5 and 6. The outlet side of each of the valve seats 5 and 6 or their corresponding passages is in common or communication with one of said ports 1 and 2 and with the inlet side of the other valve seat or passage. As shown in the drawings, the inlet sides of the valve seats 5 and 6 or their corresponding passages are designated respectively C and D, while the outlet sides are designated respectively E and F.

At the inlet side of the valve seat 5 and cooperating therewith is a main valve G, and a main valve H cooperates with the valve seat 6 at the inlet side thereof. These two valves are substantially identical in construction, and each has a piston 7 preferably integrally connected therewith and reciprocable in a cylinder 8 in the casing A. Each piston and cylinder also has a duct 9 controlled by an inwardly opening check valve 10 for permitting flow of fluid from the outlet side of the corresponding valve seat into the corresponding cylinder 8 above or behind the piston, and each main valve and piston also has another duct 11 controlled by an inwardly opening check valve 12 for permitting flow of fluid from the inlet side of the corresponding valve seat or passage into the corresponding cylinder behind or above the piston.

Each piston is loaded and actuated into closed position against its corresponding seat by a compression spring 13, and movement of each piston away from its valve seat is limited by engagement of a spider or perforate plate 70 above the ports 9 and 11 in the piston 7, with a stop screw 14 that is adjustably threaded in a removable cap or top plate 15 on the casing, whereby the capacity of the valve opening may be regulated. It will be obvious that the cap plates 15 are for the purpose of facilitating assembly, adjustment and repair of the pistons and valves.

With this arrangement, it will be observed that the lower end of each piston 7 is of larger area than the face of the corresponding valve so that said end of the piston will be subject to the fluid pressure at the inlet side of the corresponding valve seat or passage.

A pilot valve I is provided for the main valve G and a similar pilot valve K controls the main valve H. For compactness and balance in assembly of the parts, the axes of the two valves G and H are disposed in a common plane, and the pilot valves I and K are connected to opposite sides of the main casing A with the axes of the pilot valves in a common plane perpendicular to the common plane of the axes of the main valves.

Each pilot valve includes a casing 16 that has a flat or ground surface 17 in abutting contact with a similar surface 18 on the main casing A, the pilot valve casing being secured in position by bolts 19 and 20. Within the valve casing 16 is a valve chamber 21 into which leads a duct 22 from the cylinder of the corresponding main valve. A valve port 23 leads from the valve chamber 21 into a duct 24 that communicates with the outlet side of said main valve which is common with the inlet side of the valve seat of the other main valve. The valve port 23 is controlled by a pilot valve head 25 carried by the piston rod 26 of a piston 27 that is reciprocable in a cylinder 28. The valve 25 is normally closed by a compression spring 30 and is opened by the fluid pressure from the cylinder of the second-mentioned main valve that flows through a duct 31 into the cylinder 28 at one end of the piston 27. The spring 30 is enclosed in a cap 32 that is screw-threaded on the end of the valve casing 16. Preferably packing 33 is interposed between the piston 27 and the casing 16 to prevent escape of fluid from the cylinder 28. In the event that fluid does escape from said cylinder around the piston into the cap 32, the piston 27, rod 26 and valve 25 are provided with a continuous duct 34 to vent the pressure from the cap into the duct 24.

In operation of the apparatus, ordinarily the apparatus will be connected in a fluid pressure system so that one or the other of the ports 1 and 2 will be in communication with relatively high pressure while the other port will be in communication with relatively low pressure. In some instances, the apparatus may be connected to two pipe lines X and Y each of which alternately carries high pressure and low pressure, while at the same time the other pipe line carries low pressure and high pressure respectively. Assuming the port 1 to be connected to a high pressure line from which it is desired to relieve excessive pressure into the low pressure line, the main valve G will operate as the relief valve and the fluid under high pressure will enter the casing A through the port 1 under the outlet side of the valve H and at the inlet side of the valve G. The high pressure fluid will pass through the ducts 9 of the valve H, past the check valve 10 into the cylinder above the piston 7, thence through the duct 31 into the cylinder 28 of the pilot valve I which controls the main valve G. At the same time, the high pressure fluid will pass through the duct 11 of the valve G, past the check valve 12 into the cylinder of the valve G, and the outlet side of the valve G will be subject to the low pressure in the port 2 of the main casing. Accordingly the main valve G will be held positively closed by the difference in pressure at opposite sides of the corresponding piston 7.

So long as the pressure remains normal in the port 1, the valve 25 of the pilot valve I will remain closed. However, upon the occurrence of excessive pressure in the port 1, the valve piston 27 will be actuated to open the valve 25 so as to relieve the pressure from the cylinder above the piston of the main valve G, and the fluid will flow from the cylinder through the duct 22, the valve port 23, the duct 24 to the low pressure or outlet side of the valve G which is common to the inlet side of the main valve H. The duct 22, port 23 and duct 24 are of greater capacity than the duct 11 of the main valve G so that the fluid will flow from the cylinder of the main valve G faster than the fluid can flow into said cylinder through the duct 11. Therefore, the difference in pressure at opposite ends of the piston of the valve G will raise the valve from its seat 5 and permit the high pressure fluid to flow into the low pressure port 2. This will continue until the excessive pressure has been completely relieved, whereupon the valve G will again close and the initial condition will be resumed.

During this operation, the high pressure fluid from port 1 will have passed through the corresponding duct 24 and through the passage 34 in the valve, piston rod and piston of the pilot valve K into the corresponding cap 32, so as to assist in positively holding the valve 25 of the pilot valve K in closed position.

It will be obvious to those skilled in the art that when the port 2 becomes subject to the higher pressure and port 1 is subject to the lower pressure, valve H will operate as the relief valve for the high pressure from port 2 and will be controlled by the pilot valve K. It will also be understood that when either of the valves G and H and the corresponding pilot valve I or K, are operating for relieving the excessive pressure, the other main valve will be inactive.

It will also be observed that it is impossible for both of the main relief valves to open at the same time because the outlet of one of the valves is in common with the inlet of the other valve.

Another feature of the structure is that the pilot valve chamber 21 and the cylinder 28 for the pilot valve piston are in non-communicating relation, being isolated from each other by the engagement of the piston rod 26 with the adjacent portions 35 of the valve casing 16, so that the fluid pressure that actuates the pilot valve piston shall be sustained as long as the pressure exists in the cylinder of the corresponding main valve G or H. In other words, the opening of the valve 25 of either pilot valve has no effect upon the pressure in the cylinder 28. Accordingly the main valves can be accurately and positively controlled at all times and strictly in accordance with the controlling pressure.

The invention provides a simple, compact and reliable unit combination of two relief valves and their corresponding pilot valves.

While I have shown and described the now preferred embodiment of my invention, it should be understood that this is primarily for the purpose of illustrating the principles of the invention and that many modifications and changes may be made in the details of structure and the arrangement of parts without departing from the spirit or scope of the invention.

Having thus described my invention, what I claim is:

1. A fluid pressure relief valve apparatus comprising a casing having two passages each having an inlet and an outlet, and the inlet side of each passage directly communicating with the outlet side of the other, a main valve for each passage, spring means for loading and closing each main valve, means for each main valve including a piston and a cylinder to open said main valve in response to pressure difference at opposite sides of said piston, one side of said piston being subject to fluid pressure at the inlet side of the corresponding passage, a spring-closed pilot valve for each main valve, means for causing said pressure difference upon opening of said pilot valve, and means responsive to fluid pressure at said inlet side of the corresponding said passage for opening said pilot valve.

2. A fluid pressure relief valve apparatus comprising a casing having two ports either one of which may serve as an entrance for fluid while the other serves as an exit, said casing also having two passages each having a valve seat the outlet side of which communicates with one of said ports and with the inlet side of the other valve seat, a main valve for each seat at the inlet side thereof for controlling flow of fluid from the inlet side to the outlet side, said casing having a cylinder for each valve, a piston in each cylinder to actuate the corresponding valve, one end of each piston being directly subject to fluid pressure at the inlet side of the corresponding said valve seat, said piston and the corresponding valve having a duct controlled by an inwardly opening check valve for permitting flow of fluid from the outlet side of said valve seat into the cylinder behind said piston, said valve and piston also having another duct of less capacity than the first-mentioned duct and controlled by an inwardly opening check valve for permitting flow of fluid from the inlet side of said valve seat to said cylinder behind said piston, a spring for each main valve to normally load and actuate the valve into closed position, a pilot valve for each main valve and located in a valve chamber for controlling flow of fluid from the piston cylinder of the corresponding main valve to the outlet side of said valve seat of the said main valve, a cylinder having a piston therein for actuating each pilot valve, there being a duct for permitting flow of fluid into said cylinder of the pilot valve piston from the cylinder of the other main valve, and a spring for each pilot valve to normally actuate the latter into closed position.

3. The fluid pressure relief valve apparatus set forth in claim 2 wherein said pilot valve chamber and said cylinder for the pilot valve piston are in non-communicating relation to each other, whereby the fluid pressure that actuates said pilot valve piston shall not be reduced upon opening of said pilot valve.

4. A fluid pressure relief valve apparatus comprising a casing having two ports either one of which may serve as an entrance for fluid while the other serves as an exit, said casing also having two passages each having a valve seat the outlet side of which communicates with one of said ports and with the inlet side of the valve seat of the other passage, a main valve for each seat at the inlet side thereof for controlling flow of fluid from the inlet side to the outlet side, said casing having a cylinder for each valve, a piston in each cylinder to actuate the corresponding valve, one end of each piston being directly subject to fluid pressure at the inlet side of the corresponding said valve seat, said piston and the corresponding valve having a duct controlled by an inwardly opening check valve for permitting flow of fluid from the outlet side of said valve seat into the cylinder behind said piston, said valve and piston also having another duct of less capacity than the first-mentioned duct and controlled by an inwardly opening check valve for permitting flow of fluid from the inlet side of said valve seat to said cylinder behind said piston, a spring for each main valve to normally load and actuate the valve into closed position, and a spring-closed pilot valve for each main valve for controlling flow of fluid from the corresponding cylinder to the outlet side of said valve seat of the said main valve, and means responsive to the fluid pressure in the piston cylinder of said other main valve for opening each pilot valve.

5. A fluid pressure relief valve apparatus comprising a casing having two ports either one of which may serve as an entrance for fluid while the other serves as an exit, said casing also having two passages each having a valve seat the outlet side of which communicates with one of said ports and with the inlet side of the valve seat of the other passage, a main valve for each seat at the inlet side thereof for controlling flow of fluid from the inlet side to the outlet side, said casing having a cylinder for each valve, a piston in each cylinder to actuate the corresponding valve, one end of each piston being directly subject to fluid pressure at the inlet side of the corresponding said valve seat, said piston and the corresponding valve having a duct controlled by an inwardly opening check valve for permitting flow of fluid from the outlet side of said valve seat into the cylinder behind said piston, said valve and piston also having another duct controlled by an inwardly opening check valve for permitting flow of fluid from the inlet side of said valve seat to said cylinder behind said piston, a spring for each main valve to normally load and actuate the valve into closed position, a conduit for conducting fluid from the piston cylinder of each main valve to the outlet side of the valve seat of the said main valve, a spring-closed pilot valve for controlling each said conduit, and means responsive to the fluid pressure in the piston cylinder of said other main valve for opening each pilot valve.

6. A fluid pressure relief valve apparatus comprising a casing having two ports either one of which may serve as an entrance for fluid while the other serves as an exit, said casing also having two passages each having a valve seat the outlet side of which communicates with one of said ports and with the inlet side of the valve seat of the other passage, a main valve for each seat at the inlet side thereof for controlling flow of fluid from the inlet side to the outlet side, said casing having a cylinder for each valve, a piston in each cylinder to actuate the corresponding valve, one end of each piston being directly subject to fluid pressure at the inlet side of the corresponding said valve seat, said piston and the corresponding valve having a duct controlled by an inwardly opening check valve for permitting flow of fluid from the outlet side of said valve seat into the cylinder behind said piston, said valve and piston also having another duct of less capacity than the first-mentioned duct and controlled by an inwardly opening check valve for permitting flow of fluid from the inlet side of said valve seat to said cylinder behind said piston, a spring for each main valve to normally load and actuate the valve into closed position, and a normally closed pilot valve for each main valve responsive to and opened by excess fluid pressure at the inlet side of the corresponding main valve to permit flow of fluid from the piston cylinder of the same main valve to the outlet side of said main valve so as to produce a pressure difference at opposite sides of the piston of said main valve for opening the valve.

7. A fluid pressure relief valve apparatus comprising a casing having two ports either one of which may serve as an entrance for fluid while the other serves as an exit, said casing also having two passages each having a valve seat the outlet side of which communicates with one of said ports and with the inlet side of the valve seat of the other passage, a main valve for each seat at the inlet side thereof for controlling flow of fluid from the inlet side to the outlet side, and a pilot valve for each main valve to control opening of the corresponding main valve upon occurrence of excess pressure at the inlet side of said main valve.

HARRY T. WENTWORTH.